July 30, 1963　　　　M. WEISS　　　　3,099,748
PHOTOSENSITIVE DEVICE FOR MEASURING ROTATION
ABOUT A LINE OF SIGHT TO THE SUN
Filed May 23, 1961

3,099,748
PHOTOSENSITIVE DEVICE FOR MEASURING ROTATION ABOUT A LINE OF SIGHT TO THE SUN
Marvin Weiss, Pearl River, N.Y., assignor to Sperry Rand Corporation, Ford Instrument Company Division, Wilmington, Del., a corporation of Delaware
Filed May 23, 1961, Ser. No. 112,094
6 Claims. (Cl. 250—203)

This invention relates to a system for stabilizing a vehicle in space with respect to a line of sight from the vehicle to external objects including stellar bodies. Specifically the system hereinafter described employs an expedient for determining the degree of angular rotation about the line of sight assuming this line is stabilized by other means with respect to the two axes perpendicular thereto.

Hitherto, vehicle stabilization using optical techniques has been about the two axes perpendicular to this line of sight drawn, for example, to the sun. To obtain third axis stabiliaztion required an entirely separate device such as a gyro or a start tracker.

In general, the system which embodies the invention uses a scanner to develop a video signal corresponding to the physical pattern of the scanned objects and uses this signal to compare with a second signal generated as a consequence of a subsequent scan of the same objects. A voltage developed on the basis of phase comparison of the two signals will afford an indication of vehicle rotation on the line of sight. A differential voltage comparison expedient affording an indication of the direction of the vehicle rotation is also provided.

An object of the invention is to provide a device for measuring and detecting the direction of vehicle rotation about a line of sight.

There follows a more detailed description of one embodiment of the invention which is taken in conjunction with the accompanying drawings in which.

Figure 1:
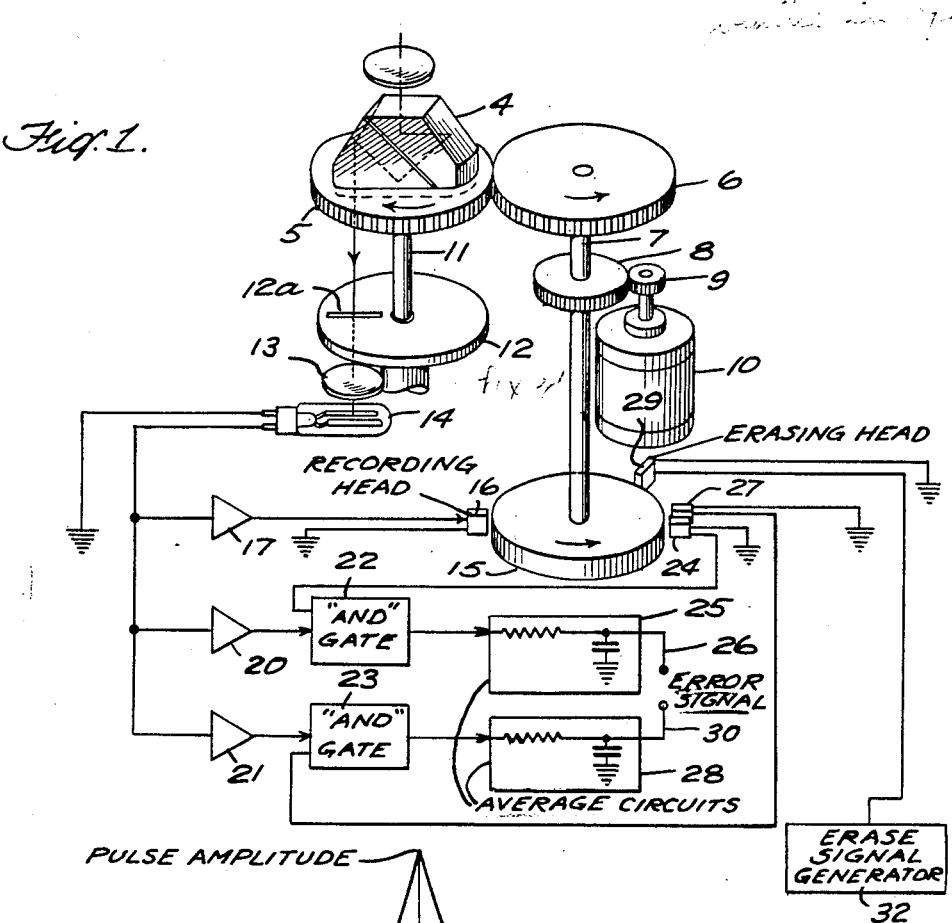
FIG. 1 shows the system for measuring rotation about a line of sight.

Referring to FIG. 1 a Pechan prism 4 is stabilized on an external object, for example, in this case a reference star so that there is maintained a constant line of sight to the star. A Pechan prism is a prism which is rotatable on a longitudinal axis to impart rotation to the image through an angle which is twice that of the rotated prism. This stabilization may be effected as by a sun or star tracker. The reference star is in the center of the field, and all other stars will describe, on rotation of the prism, concentric circles about the center. The prism is rotated on its optical axis by virtue of its being mounted on an apertured gear 5 which is in mesh with a gear 6, the two gears being in this instance in a one to one ratio. The gear 6 is mounted on a shaft 7 to which is secured a reduction gear 8. A gear 9 mounted on the armature shaft of motor 10 engages the gear 8 and thereby causes the gear train and Pechan prism 4 to rotate.

The gear 5 is mounted on a shaft 11 on which is journaled a disc 12. The disc 12 is fixed and is provided with a very narrow, radial slit 12a which is adapted to receive and pass a light beam when the light system is properly located with respect to a source. Directly beneath the slit 12a is a condensing lens 13 arranged to cause the transmitted light to fall on the activating element in photocell 14.

A single track magnetic recording drum 15 is mounted on the bottom of the shaft 7 and is thereby driven in rotation synchronously with the Pechan prism 4. A recording head 16 associated with the recording drum 15 is connected through amplifier 17 to the photocell 14.

Also directly connected to the photocell 14 through amplifier 20 and 21 are pulse comparators which in this case are "And" gates 22 and 23, respectively. A read-out head 24 is disposed in proximity to the recording surface of the drum 15 and at a point which is slightly less than 180° from the recording head 16. This read-out head is designated the early read-out head.

The early read-out head 24 is connected to the "And" gate 22, the output of which is placed into an averaging circuit 25. Error signal lead 26 in the output of the circuit 25 constitutes one side of the voltage differential circuit on which there is represented an error signal representative of vehicle rotation and direction thereof with respect to the line of sight.

A late read-out head 27 is disposed in proximity to the recording surface of the drum 15 being located slightly more than 180° from the recording head 16. The late read-out head 27 is directly connected to the "And" gate 23. An averaging circuit 28 is connected to the output of the "And" gate 23 and yields a D.C. voltage on lead 30 which is derived basically in the "And" gate 23 as a consequence of the phase comparison of the instantaneous photocell and the recorded pulses picked off from the drum. An erase signal head 29 is also placed in proximity to the operative surface of the drum and is connected to an erase signal generator 32.

In operation, it is assumed that the optical system of the device is stabilized with reference to the two perpendicular axes to the line of sight. Accordingly, a reference star may be maintained in the center of its field. If rotation occurs about the line of sight, all other stars whose images are permitted to fall on the photocell by the radial slit in the disc 12 will describe concentric circles about the center. The series of pulses constituting the video signal generated by the photocell is characteristic of this particular line of sight and the signal is always the same providing the vehicle does not rotate about the line of sight.

Figure 2:
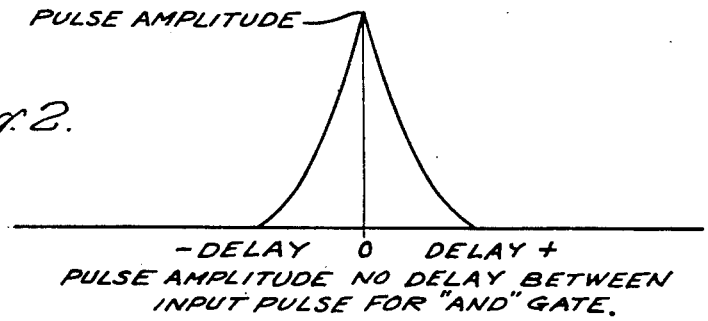
FIG. 2 is a pulse amplitude-delay diagram.

If instead of there being two read-out heads as described hereinabove, there were one head located on the recording drum at a location corresponding to 180° of the Pechan prism, then its output would be a series of pulses delayed one half cycle of image rotation. At this point the second image generated by the Pechan prism 180° from its twin image would be positioned above the slit by the prism causing the photocell to generate a video pulse corresponding thereto. If the vehicle has not rotated, this pulse will occur simultaneously with the recorded pulse and picked off by the read-out head. On the other hand, if the vehicle has rotated in the same direction as the drum the resultant rotation of the prism is diminished and the read-out pulses would occur earlier but if the vehicle is rotated in a direction opposite to the drum, the effective rotation of the prism as a consequence of the vehicle rotation would be in the same direction as its geared rotation so as to cause the pulse from the photocell to occur earlier than the read-out pulse. In either case, as shown in FIG. 2, the output of an "And" gate connected to the read-out gate diminishes and if there is sufficient delay between the photocell and read-out pulses in the "And" gate so that there is no overlapping between the two pulses, the output of the "And" gate would be zero. It is seen that the magnitude of the output representing velocity of vehicle rotation is governed by a comparison in terms of phase of the two pulses.

Figure 3:
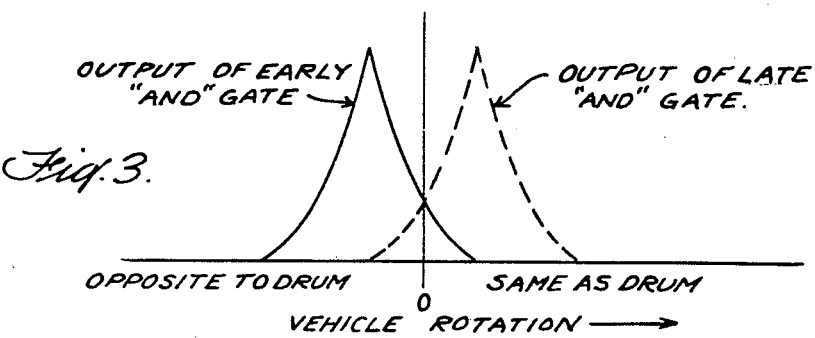
FIG. 3 is a voltage versus vehicle rotation diagram.

The two "And" gates described above for the preferred embodiment of invention operate as phase comparator circuits, respectively, for the early and late read-out gates on the recording drum. Their output is averaged by means of the R.C. circuits. Since early read-out gate 24 is located slightly less than 180° from the recording head itself, "And" gate 22 will produce its maximum output when the vehicle is moving slowly opposite to the drum rotation since under these conditions the photocell output will occur slightly ahead of the output for zero vehicle rotation. (See FIG. 3.) Similarly, as shown in FIG. 3, the output of the late read-out head 27 will be maximum if the vehicle is rotating slowly in the same direction as the drum rotation since under these conditions the effective rotation of the prism is decreased and, as a consequence, the photocell output will not occur until slightly later.

If the vehicle is not rotating, the voltages appearing on output leads 26 and 30 of the error circuit will be equal. As indicated in FIG. 3 if vehicle rotation is in one direction, the output of one gate will increase while the other is decreasing and the resulting differential appearing on leads 26 and 30 will afford an indication of the vehicle's direction of rotation as well as its velocity. If it rotates in the opposite direction, the reverse will occur. Accordingly, it is seen that the magnitude of the differential voltage in the error circuit and the relative polarity of the two voltages appearing on their respective leads in this circuit will afford an indication of the vehicle's rate of rotation and direction, respectively.

The error signal appearing in the output of the device can be used by components, whose arrangement is outside the scope of this invention, to bring the vehicle's rotation to a halt. It is apparent that the line of sight, instead of being trained on a particular star of a star cluster may be stabilized on other space objects. If the device were installed in an earth-bound vehicle natural or artificial objects on the surface of the earth may be included in the circular scan of the optical system.

Various modifications of the device may be effected by persons skilled in the art without departing from the scope and principle of invention as defined in the appended claims.

What is claimed is:

1. A device for measuring the rate of rotation about a line of sight, comprising a circular scanning optical system, a recorder, operative means for synchronously driving together at a preselected relative angular speed of rotation said optical system and said recorder, a single light responsive generating component arranged to receive the optical output of said system, said recorder having a recording head connected to said component, a read-out head in close proximity to said recorder, and means for producing an output voltage whose magnitude is governed by the relative phase of the instantaneous output of said component and the output of said read-out head.

2. A device for measuring the rate of rotation about a line of sight, comprising a circular scanning optical system, a recorder, operative means for synchronously driving together at a preselected relative angular speed for rotation said optical system and said recorder, a single light responsive generating component arranged to receive the optical output of said system, said recorder having a recording head connected to said component, a read-out head in close proximity to said recorder, and a phase comparator circuit connected to said component and to said read-out head.

3. A device for measuring the rate of rotation about a line of sight, comprising a circular scanning optical system, a recorder, operative means for synchronously driving together at a preselected relative angular speed of rotation said optical system and said recorder, a single light responsive generating component arranged to receive the optical output of said system, said recorder having a recording head connected to said component, a read-out head in close proximity to said recorder, a phase comparator circuit connected to said component and to said read-out head and an erase signal generating circuit associated with said recorder.

4. A device for indicating the rate and direction of rotation about a line of sight, comprising a circular scanning optical system, a recorder, operative means for synchronously driving said optical system and said recorder, a light responsive generating component arranged to receive the optical output of said system, said recorder having a recording head connected to said component, a read-out head in close proximity to said recorder located at a point about said recorder slightly less than 180° from said recording head, a second read-out head located in close proximity to said recorder at a point slightly more than 180° from said recording head, a phase comparison circuit connected to said component and to the first mentioned read-out head, a second phase comparison circuit connected to said component and to the second mentioned read-out head and an error signal circuit connected to the output of said phase comparison circuits.

5. A device for indicating the rate and direction of rotation about a line of sight, comprising a circular scanning optical system, a recorder, operative means for synchronously driving said optical system and said recorder, a light responsive generating component arranged to receive the optical output of said system, said recorder having a recording head connected to said component, a read-out head in close proximity to said recorder, located at a point about said recorder slightly less than 180° from said recording head, a second read-out head located in close proximity to said recorder at a point slightly more than 180° from said recording head, an "And" gate connected to said component and to the first mentioned read-out head, a second "And" gate connected to said component and to the second mentioned read-out head and an error signal circuit connected to the output of said "And" gates, said error signal circuit having an averaging circuit connected to each of said "And" gates.

6. A device for indicating the rate and direction of rotation about a line of sight, comprising a circular scanning optical system, a recorder, operative means for synchronously driving said optical system and said recorder, a light responsive generating component arranged to receive the optical output of said system, said recorder having a recording head connected to said component, a read-out head in close proximity to said recorder, located at a point about said recorder slightly less than 180° from said recording head, a second read-out head located in close proximity to said recorder at a point slightly more than 180° from said recording head, an "And" gate connected to said component and to the first mentioned read-out head, a second "And" gate connected to said component and to the second mentioned read-out head and an error signal circuit connected to the output of said "And" gates, said error signal circuit having an averaging circuit connected to each of said "And" gates and an erase signal generating circuit including an erase head associated with said recorder.

References Cited in the file of this patent

UNITED STATES PATENTS

| | | |
|---|---|---|
| 2,830,487 | Griffith | Apr. 15, 1958 |
| 2,878,711 | Blackstone | Mar. 24, 1959 |
| 2,999,939 | Bible et al. | Sept. 12, 1961 |